United States Patent
Fidler et al.

(10) Patent No.: US 12,430,842 B2
(45) Date of Patent: Sep. 30, 2025

(54) DIFFERENTIABLE OBJECT INSERTION USING HYBRID LIGHTING VOLUMES FOR SYNTHETIC DATA GENERATION

(71) Applicant: Nvidia Corporation, Santa Clara, CA (US)

(72) Inventors: Sanja Fidler, Toronto (CA); Zian Wang, Toronto (CA); Jan Kautz, Lexington, MA (US); Wenzheng Chen, Toronto (CA)

(73) Assignee: Nvidia Corporation, Santa Clara, CA (US)

( * ) Notice: Subject to any disclaimer, the term of this patent is extended or adjusted under 35 U.S.C. 154(b) by 384 days.

(21) Appl. No.: 17/886,081

(22) Filed: Aug. 11, 2022

(65) Prior Publication Data

US 2024/0054720 A1    Feb. 15, 2024

(51) Int. Cl.
*G06T 15/50*  (2011.01)
*G06T 5/92*   (2024.01)
*G06T 7/586*  (2017.01)
*G06T 19/00*  (2011.01)

(52) U.S. Cl.
CPC .............. *G06T 15/506* (2013.01); *G06T 5/92* (2024.01); *G06T 7/586* (2017.01); *G06T 19/006* (2013.01); *G06T 2207/20081* (2013.01); *G06T 2207/20208* (2013.01)

(58) Field of Classification Search
CPC .............. G06T 15/506; G06T 19/006; G06T 2207/20208; G06T 2215/16; G06T 2207/20081; G06T 2207/20084; G06T 15/50; G06T 19/00; G06T 5/90; G06T 15/55; G06T 15/06; G06T 2207/10152; G06T 17/00; G06T 2200/08; G06F 3/011; G06V 20/20; G06V 10/60; G06V 10/82
See application file for complete search history.

(56) References Cited

U.S. PATENT DOCUMENTS

2020/0186714 A1*  6/2020  Hold-Geoffroy ...... G06V 10/82
2023/0368459 A1*  11/2023 Garon ................... G06V 10/82

OTHER PUBLICATIONS

Debevec, Paul. "Rendering synthetic objects into real scenes: Bridging traditional and image-based graphics with global illumination and high dynamic range photography." Acm siggraph 2008 classes. 2008. 1-10. (Year: 2008).*

Hosek, Lukas, and Alexander Wilkie. "An analytic model for full spectral sky-dome radiance." ACM Transactions on Graphics (TOG) 31.4 (2012): 1-9. (Year: 2012).*

* cited by examiner

*Primary Examiner* — Xiao M Wu
*Assistant Examiner* — Scott E Sonners
(74) *Attorney, Agent, or Firm* — Hogan Lovells US LLP

(57) ABSTRACT

Systems and methods generate a hybrid lighting model for rendering objects within an image. The hybrid lighting model includes lighting effects attributed to a first source, such as the sun, and to a second source, such as spatially-varying effects of objects within the image. The hybrid lighting model may be generated for an input image and then one or more virtual objects may be rendered to appear as if part of the input image, where the hybrid lighting model is used to apply one or more lighting effects to the one or more virtual objects.

19 Claims, 13 Drawing Sheets

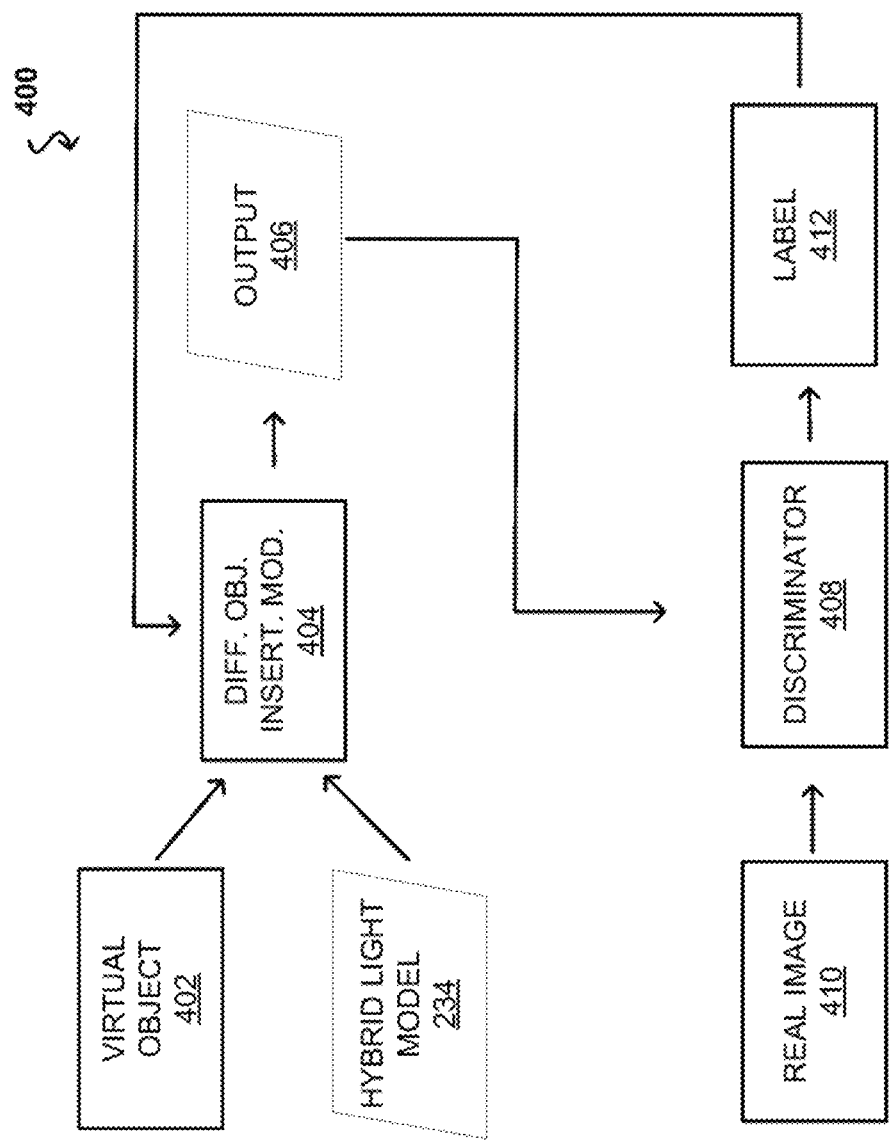

DIFFERENTIABLE OBJECT INSERTION USING HYBRID LIGHTING VOLUMES FOR SYNTHETIC DATA GENERATION

BACKGROUND

Realistic lighting models for object rendering face challenges when different light sources have different intensities and/or positions. This may be exacerbated with outdoor scenes, where lighting provided by the sun may be several orders of magnitude brighter than other light sources. When lighting an object, such as an object rendered into an outdoor scene, interactions with both the object and the surrounding objects may be used to improve realism and immersion. However, the intensity of the sun may cause problems with spatially-varying effects that lead to inaccurate lighting estimation. Attempts to correct these problems typically neglect the high dynamic range (HDR) of the sun, thereby providing incomplete approaches to lighting in outdoor scenes.

BRIEF DESCRIPTION OF THE DRAWINGS

Various embodiments in accordance with the present disclosure will be described with reference to the drawings, in which:

FIG. 4A illustrates an example representation of a differentiable object insertion system, according to at least one embodiment;

DETAILED DESCRIPTION

Approaches in accordance with various embodiments address challenges of outdoor lighting estimation for photorealistic virtual object insertion, such as into photographs or video sequences. The systems and methods overcome deficiencies of convention techniques—such as those described above—by providing a hybrid model that accounts for both a high dynamic range (HDR) provided by an intense outdoor source, such as the sun, and also addresses spatially-varying effects due to surrounding objects in the scene. In at least one embodiment, a neural approach is incorporated that estimates a full five-dimensional (5D) spatially-varying HDR light field using, as an input, a single image and a differentiable object insertion formulation. Various embodiments may design a hybrid lighting representation that may be tailored or otherwise directed toward one or more outdoor scenes. The hybrid lighting representation may include an HDR environment map to address the lighting provided by the sun (e.g., high intensity) and a volumetric lighting representation to model the spatially-varying appearance of the surrounding scene with respect to an object within the scene. Embodiments may also incorporate a differentiable object insertion formulation that uses adversarial training. Systems and methods of the present disclosure may be used in a variety of implementations, including but not limited to, augmented reality (AR), virtual reality (VR), and/or mixed reality (MR) objection insertion, image generation and rendering, autonomous or semi-autonomous machine control, synthetic data generation for training datasets, and the like.

Embodiments of the present disclosure provide a neural approach that estimates a fully 5D spatially-varying HDR light field from, e.g., a single image and a differential object insertion formulation that facilitates end-to-end training with a downstream object insertion objective. Various embodiments incorporate a hybrid lighting component that is formed from an encoder-decoder architecture for modeling HDR sky and a volumetric spherical Gaussian representing scene lighting. For object insertion, light transport simulation (e.g., ray-tracing and/or path tracing) can be used to capture second-order lighting effects. Accordingly, systems and methods provide for rendering synthetic 3D objects into real imagery in a realistic way.

Figure 1:
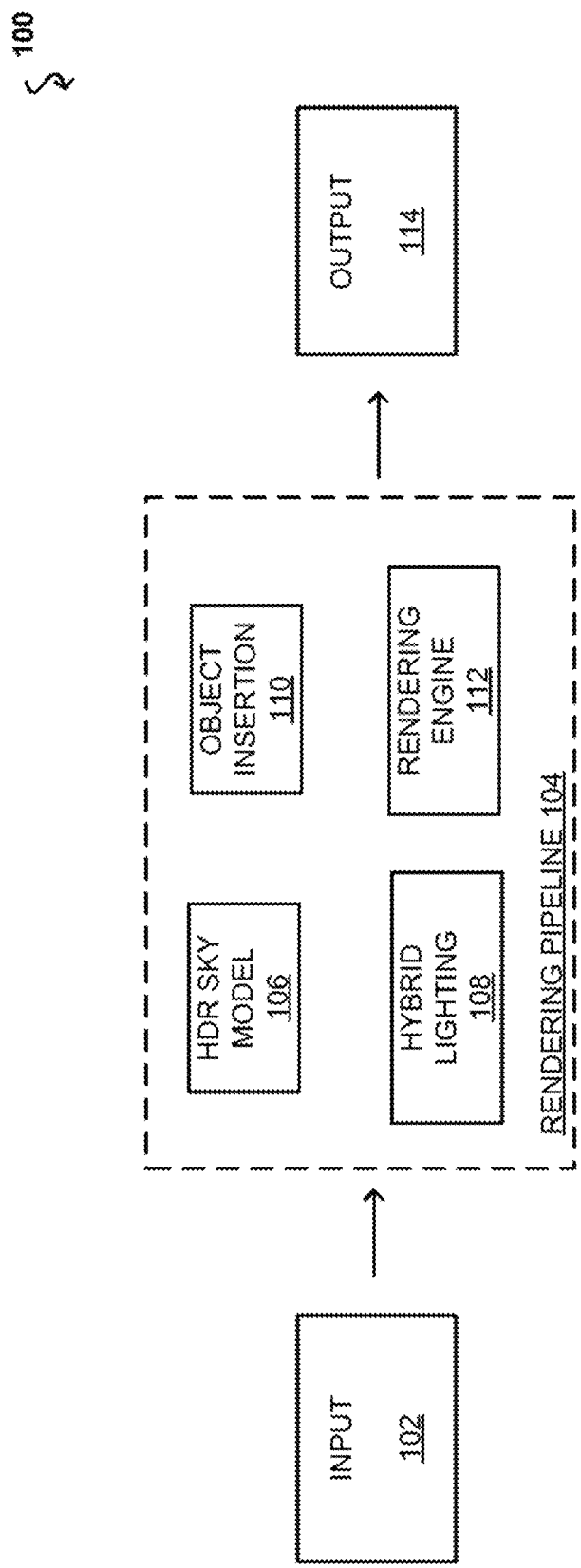
FIG. 1 illustrates an example of an environment for rendering images, according to at least one embodiment.

FIG. 1 illustrates an example environment 100 that can be used to provide such functionality in accordance with at least one embodiment. In this example, the environment may be associated with one or more rendering systems, such as a game engine, an AR/VR/MR system, a motion detection system, a navigation system, an imaging system, or the like. As shown, an input 102 is provided to a rendering pipeline 104. The input 102 may include image data, such as an image for an outdoor scene, a video sequence from which one or more frames are extracted, a rendered image, or the like. Additionally, multiple images or sequences can be included as part of the input 102. The input 102 may be provided from an optical capture device, such as a video recorder, where the input 102 may be a live video feed, a stored video file, a generated video image, or some combination thereof. The input may also be part of gameplay footage, such as footage produced by a graphics processor by executing a video game. Additionally, the input 102 may include one or more images received from and/or generated using a game engine for rendering on a display, which may be responsive to one or more actions input by a user.

The input 102 may include one or more images, where the images may be different images that are used by different modules or procedures of the rendering pipeline 104. For example, a first image may include a low dynamic range (LDR) panoramic image. Additionally, the input may include an image, such as an image taken by a camera or an image extracted from a frame of a video. Furthermore, the input 102 may include image information, such as depth information, where the depth information may be associated with one or more image capture devices capable of obtaining depth information and/or may be estimated using one or more depth estimation methods.

In various embodiments, the input 102 includes at least one LDR panoramic image that is used by an HDR sky model 106. The HDR sky model 106 is used to estimate lighting caused by the extreme intensity (e.g., intensity several orders of magnitude greater than other lighting sources) found in outdoor scenes. The HDR sky model 106 may be used to model the sky dome that can be used alongside a lighting volume. In at least one embodiment, the HDR sky model 106 is used to generate a representation of an environment map at infinity. For example, the HDR sky model may be used to represent a relatively simple scene, such as a scene that includes a sun, sky, possibly clouds, etc., that therefore has lower dimensional representations when compared to a traditional environmental map. Accordingly, the HDR sky model 106 may use an encoder-decoder architecture to compress an LDR panorama, which may be a portion of the input 102, into a sky feature vector that is decoded into an HDR sky dome. The sky feature vector may include, at least in part, a peak intensity, a peak direction, and a latent vector associated with other parameters of the sky dome.

Information associated with the HDR sky model 106 (e.g., a generated HDR sky dome) may be passed to the hybrid lighting engine 108 in order to generate the hybrid lighting model based, at least in part, on the HDR sky model and a lighting volume. The hybrid lighting engine 108 may receive, at least in part, portions of the input 102 that include an image, which may be the image which will be used for object insertion, as well as depth information, among other options. In at least one embodiment, a lighting feature vector may be generated that maps the global feature to a scene global feature volume. From the lighting feature vector, a lighting volume for the input image may be generated and combined with the HDR sky dome in order to develop the hybrid lighting model. The hybrid lighting model may be specific to the input image where a virtual object will be inserted. That is, the specific spatially-varying affects may be evaluated for a specific scene in which the object will be inserted, thereby providing improved realism over a generic lighting volume.

The hybrid lighting model may then be used by an object insertion engine 110 that takes, as an input, one or more of the input 102 and/or a virtual object. The virtual object may be inserted within the image, for example at a determined location, where the hybrid lighting model is used to realistically illuminate the object within the image. Illuminating the image may include adding one or more lighting effects, such as shadows, reflections, and the like. The lighting effects may be applied to the object itself (e.g., reflection on a window from the sun) or may be applied to surrounding objects due to the insertion of the object (e.g., casting a shadow on the street). During training, as will be described below, a discriminator may be used to determine between "real" and "fake" images and then provide feedback to improve the model. This information may then be provided to a rendering engine 112 for generation of an output image 114.

Various embodiments address outdoor lighting estimation that may take monocular imagery as an input, among other options. The systems and methods may be used in a variety of applications, such as virtual object insertion, that may be used in industries and applications including architectural visualization, realistically rendering objects in AR/VR/MR applications, or augmenting real datasets with 3D assets that are otherwise hard to record in the real world, such as construction vehicles and exotic animals, for the purpose of training more performant computer vision models. Embodiments overcome and address problems in lighting estimation where spatially-varying effects are addressed at the expense of HDR intensities, which may be unsuitable for outdoor scenes. Additionally, methods that focus on and predict sky parameters or use deep sky models may ignore the spatially-varying effects and lack high-frequency details. These limitations may result in inaccurate lighting estimation and/or may hamper virtual object insertion effects. Accordingly, embodiments of the present disclosure provide a neural approach that estimates the full 5D spatially-varying HDR light field from a single image and a differentiable object insertion formulation that facilitates end-to-end training with the downstream insertion objective. Specifically, a hybrid lighting representation is tailored to outdoor scenes, which contains a HDR environment map that handles the extreme intensity of the sun, and a volumetric lighting representation that models the spatially-varying appearance of the surrounding scene. The differentiable object insertion formulation uses adversarial training over the composited image to provide a supervisory signal to the lighting parameters.

Figure 2A:
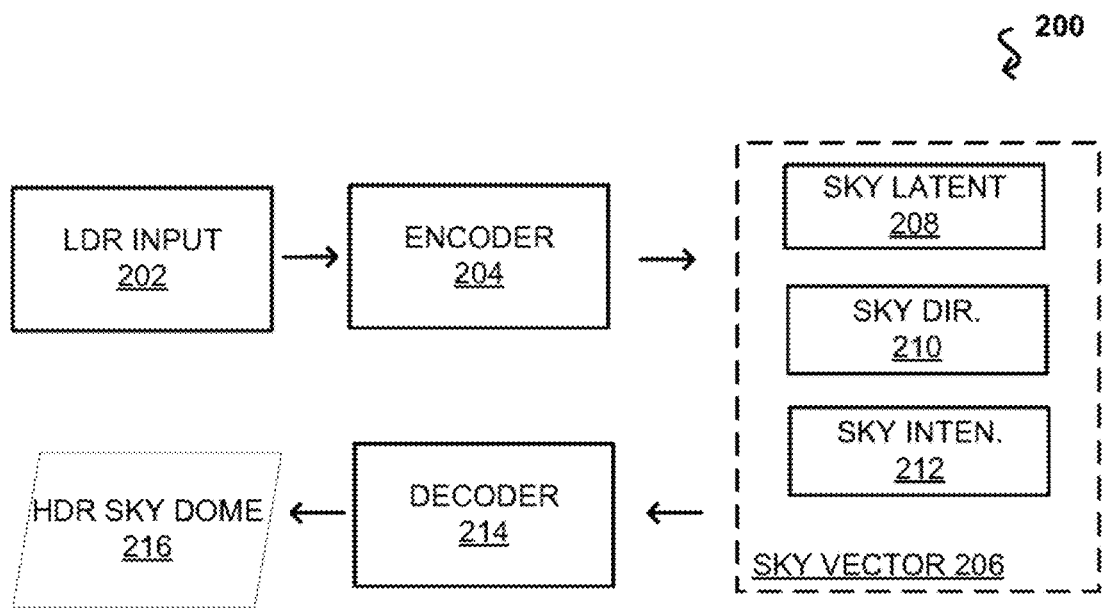
FIG. 2A illustrates an example representation of a sky modeling system, according to at least one embodiment.

FIG. 2A illustrates a representation 200 of the HDR sky model 106 that includes an encoder-decoder in order to generate a sky dome based, at least in part, on an input image for an outdoor scene. As noted, the HDR sky dome may be used to model the sunlight or other sources of light that may be several orders of magnitude greater than other light sources within a scene. In this example, the sky dome represents a simplified structure that includes, for example, a sun (e.g., main light source), a sky region, and potentially clouds or other objects that may overlay or otherwise obscure portions of the sky region or the sun. The HDR sky model may provide a simplified, lower resolution representation when compared to a typical environment map, but may be easier to predict using the illustrated encoder-decoder architecture of FIG. 2A. In this example, an LDR input 202 is provided, which may be an LDR panorama. The LDR panorama may be of a representative sky or may be associated with a specific scene to be rendered. An encoder 204 is used to compress the LDR input 202 into a sky vector 206, which includes components associated with a sky latent vector 208, a sky peak direction 210, and/or a sky peak intensity 212. These components allow control of the sky dome by adjusting and/or modifying the peak direction 210 and/or the peak intensity 212. The encoder 204 may include a 2D convolutional neural network (CNN) with positional encoding and a decoder 214 may be a UNet encoded with peak intensity and direction. As a result, the HDR sky dome 216 may be provided to model or otherwise represent a light source within an outdoor scene.

Figure 2B:
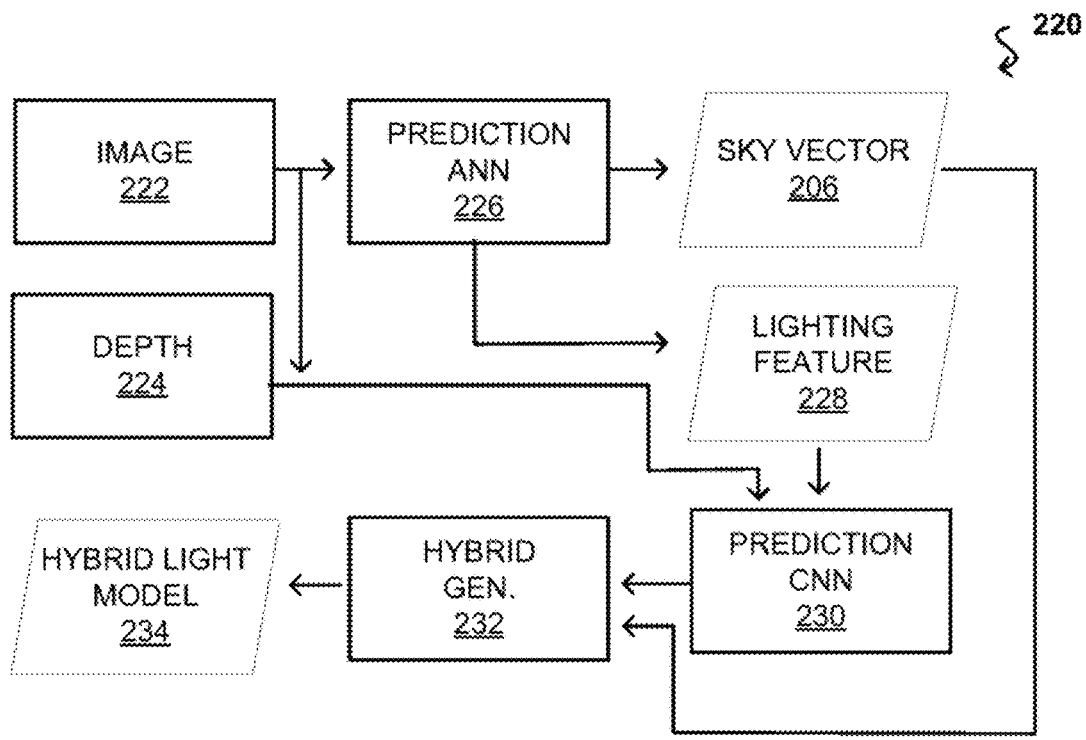
FIG. 2B illustrates an example representation of a hybrid light model system, according to at least one embodiment.

FIG. 2B illustrates a representation 220 of a hybrid lighting joint estimation where the HDR sky dome 216 is joined to a generated lighting volume in order to develop a hybrid lighting model that combines the benefits of the sky dome (e.g., accommodating high intensity lighting from outdoor scenes) while also maintaining complex lighting effects associated with localized shadows, among other causes. In this example, an image 222 and depth information 224 are provided as inputs. The image 222 may correspond to a scene in which one or more objects will be rendered. For example, the image 222 may be an outdoor scene that includes one or more features. In this example, two different streams are used, one to predict the sky dome and one to generate a lighting volume and subsequently combine the sky dome and lighting volume into a hybrid lighting model. Given the input image 222, the first stream may be used to predict an HDR sky feature vector, as noted above, by using a prediction artificial neural network (ANN) 226 to generate the sky vector 206, which may include components such as the sky latent 208, sky direction 210, and/or the sky intensity 212. In at least one embodiment, the pipeline of FIG. 2A may be used with the first stream of the hybrid lighting joint estimation 220.

In this example, the prediction ANN 226 may also generate a lighting feature 228 that may be used by a prediction CNN 230 to generate a volumetric lighting model. For example, one or more embodiments may use a volumetric spherical Gaussian (VSG) to represent the nearby surrounding scene to accommodate and capture lighting effects caused by localized shadows and the like. The VSG may include, without limitation, a 7-parameter spherical Gaussian lobe to model lighting of the corresponding scene location, as well as an alpha channel to represent opacity. It should be appreciated that the prediction CNN 230 may be trained on one or both of synthetic data or real data, where the synthetic data may include rendered indoor or outdoor scenes.

In at least one embodiment, the VSG lighting volume is predicted by unprojecting the 2D scene information into a 3D volume and adopting a 3D UNet to convert the scene volume into the lighting volume. It should be appreciated that unprojection may require or be enhanced with depth information, and as a result, the depth 224 may be provided to the prediction CNN 230. Various embodiments may adopt a self-supervised pre-trained monocular depth estimation model to predict a dense depth map. Additionally, depth information may be provided by or received from additional sources, such as additional equipment, or in the case of rendered images, from a G-buffer or other source. The output lighting volume and may be combined with the sky vector 206 at the hybrid generation module 232 in order to provide a hybrid light model 234.

Figure 3:
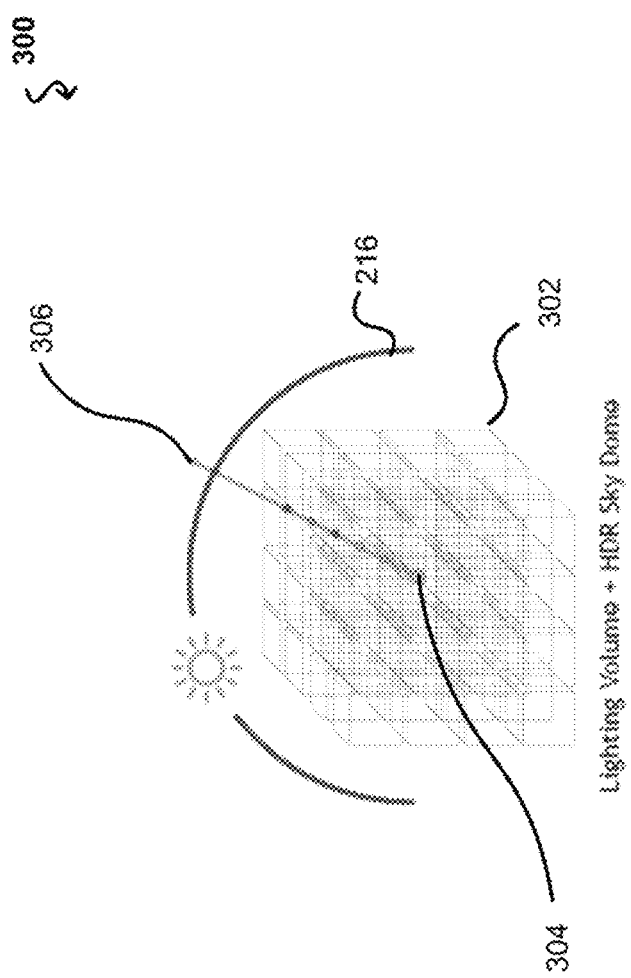
FIG. 3 illustrates an example representation of a lighting representation using a hybrid light model, according to at least one embodiment.

Accordingly, representations of both volumetric lighting and a sky dome are generated, therefore providing a 5D light field, allowing for queries of lighting intensity at any 3D point along any ray direction. FIG. 3 illustrates a representation 300 illustrating a radiance function, in accordance with embodiments of the present disclosure. In this example, a volume 302 includes a point 304. The volume 302 is illuminated with the hybrid light model, which includes the HDR sky dome 216. In order to compute the radiance along a ray 306, the ray is shot through the lighting volume 302 and finally hits or interacts with the sky dome 216. To compute the lighting intensity for the ray 306, K equi-spaced locations are selected along the ray and a nearest neighbor interpolation provides voxel values from the light volume. Then, the intensity in the direction of the ray 306 may be obtained via bilinear interpolation. The final HDR radiance can then be computed using volume rendering, as shown in Equation (1):

$$L(x,1) = (\Sigma_{k=1}^{K} \tau_{k-1} - \alpha_k G(-1; \xi_k)) + \tau_K L_{env}(1) \quad (1)$$

where the location corresponds to $x \in \mathbb{R}^3$ in the direction $1 \in S^2$ and $\tau_k = \Pi_{i=1}^{k}(1-\alpha_i)$.

Various embodiments of the present disclosure may use the hybrid lighting estimation for object insertion into a scene. For example, an object may be a virtual object (e.g., a computer-generated object) or an object that is extracted from an image. This object may then be presented within and rendered into a new scene, for example a scene that is illuminated using the hybrid lighting estimation. Because the hybrid lighting estimation is used, the object may be more naturally illuminated, thereby providing an improvement in how the item appears to a user and/or to allow for more true-to-real or accurate generation of synthetic data for training one or more machine learning systems. Given an estimated lighting representation, a 3D object can be rendered into a scene in scenarios where ground truth is not easily available, such as with outdoor lighting scenes. Accordingly, embodiments may further refine object insertion and use of the lighting model by implementing adversarial training on composite images. Accordingly, embodiments may provide a differentiable object insertion module. In at least one embodiment, a virtual object may be inserted into a scene or image I with a known depth D, where the virtual object has a known geometry M and material 6. As noted above, such an object is not only influenced by the scene lighting, but should also affect the scene itself, for example, by reflecting or blocking light with respect to surrounding objects.

FIG. 4A illustrates a representation 400 of a differentiable object insertion system that includes, as an input, the hybrid lighting module 234 to generate an image inserting a virtual object into a scene. In this example, the virtual object 402 may come from a database of objects, such as a set of CAD models that have been generated for use with the system. By way of example and not limitation, the models may include cars, buildings, plants, animals, and/or the like. For example, the objects may be architectural renderings to generate realistic renderings of how a building or a park will appear in a scene. Alternatively, the objects may correspond to cars to show how the cars will appear in a scene. In another example, the objects may be animals, such as endangered species, that may be used to render realistic images that may then be used to train object classification systems to identify certain animals within a scene. The hybrid lighting model 234 is also provided in this example, where the lighting model 234, as noted above, may be used to provide lighting for both the scene in general and spatial lighting effects.

Various embodiments include a differential object insertion module 404 that is used to render the virtual object using the predicted hybrid light model using a physically-based renderer. During rendering, rays are shot from a camera origin to the scene, where a ray-mesh intersection detection may be applied for the rays and the object M. For each intersected ray, a G-buffer of the location of the intersection x may be created, along with the surface normal n and the material properties Θ. Monte-Carlo numerical integration may then be used to accommodate multiple rays, as shown in Equation (2):

$$I_x = \frac{1}{N} \sum_{k=1}^{N} \frac{f(l_k, v; \theta) L(x, l_k)(n \cdot l_x)^+}{p(l_k)} \quad (2)$$

where L(•,•) is the radiance query function as defined in Equation (1), N, and $l_k$ is the number and direction of sampled lighting, v is the viewing direction of the camera ray, and, f is a Bidirectional Rendering Distribution Function (BRDF), such as Disney BRDF.

In order to address the memory intensive restraints of traditional Monte-Carlo rendering, embodiments of the present disclosure may uniformly select N light directions $\{l_k\}_{k=1}^{N}$ on the unit sphere and use the object center x, as a starting point. While this simplification may ignore the object shape and use lighting in the object center for rendering, during inference time, importance sampling may be used for each pixel to create better rendering effects.

As noted, the inserted object will change the light transport in the scene and affect the appearance of the background scene pixels, which generally causes shadows. For example, the inserted object may block light that would have otherwise interacted with an object in the scene. Additionally, the inserted object may have reflections that also affect the remaining scene. Various embodiments may implement one or more light transport simulation algorithms (e.g., ray tracing algorithms) to generate shadow maps for the inserted objects. For example, for each scene pixel p, a 3D location x may be computed from the depth map D. The lighting distribution may be computed prior to object insertion as $\{L(x_s,l_k)\}_{k=1}^{N_s}$, where $\{l_k\}_{k=1}^{N}$ are uniformly selected light directions on the upper hemisphere. After object insertion, the rays starting from $x_s$ in the direction $l_k$ may potentially get occluded by the inserted objects, resulting in a post-insertion lighting distribution $\{L'(x_s,l_k)\}_{k=1}^{N_s}$. This post-insertion lighting distribution may be computed by performing a ray-mesh query for all rays. That is, if ray $(x_s, l_k)$ is occluded by the inserted object, then the intensity value is set to an ambient value Ia, which may be empirically set, such as 0.1, while the lighting intensities of non-occluded rays remain the same as the original radiance. Accordingly, shadow effects may be defined as the ratio of the pixel intensity values before (I) and after (I') object insertion, as shown by Equation (3):

$$S_p = \frac{I'_p}{I_p} = \frac{\sum_{k=1}^{N_s} f_{scene}(x_s l_k, v; \theta) L'(x_s, l_k)(n \cdot l_k)^+}{\sum_{k=1}^{N_s} f_{scene}(x_s l_k, v; \theta) L(x_s, l_k)(n \cdot l_k)^+} \quad (3)$$

where the bidirectional reflectance distribution function (BRDF) of the scene pixel $f_{scene}$ and normal direction n are unknown. In many cases, object insertion will occur on flat surfaces, and as a result, the approximation may be simplified by assuming the normal direction is pointing upwards. Further simplification may be provided by assuming the scene surface is Lambertian with a constant diffuse albedo $f_{scene}(x_s, l_k, v) = f_d$. Accordingly, the BRDF term may be moved outside the sum in Equation (3), which leads to Equation (4), which can be computed with the estimated lighting L. Thereafter, scene pixels after insertion can be computed by multiplying the shadow map $I' = S \odot I$.

$$S_{p_s} = \frac{\sum_{k=1}^{N_s} L'(x_s, l_k)(n \cdot l_k)^+}{\sum_{k=1}^{N_s} L(x_s, l_k)(n \cdot l_k)^+} \quad (4)$$

In various embodiments, forward rendering may be differentiable for both foreground objects and background shadows, which enables back propagation of gradients from image pixels to the lighting parameters. For each foreground pixel, the rendered appearance of the inserted object may be computed using Equation (2), where the gradients from $I_x$ to $L(x, l_k)$ can be computed by BDRF times the co-sine value. Gradients from background pixels I' with respect to the lighting L can be computed via $$\frac{\partial I'}{\partial L} = \frac{\partial S}{\partial L} I,$$

where the shadow ratio S in Equation (4) is also differentiable with respect to lighting L.

The differentiable object insertion module 404 may then generate an output 406, which corresponds to the virtual object 402 being rendered within an image and illuminated using the hybrid light model 234. This output 406 may then be evaluated within a discrimination 408 against a real image 410 (e.g., a ground truth image), where a label 412 may be generated to identify the images as either real or fake. Information associated with the label may be fed back to the differentiable object insertion module 404 to update and refine the model.

Figure 4B:
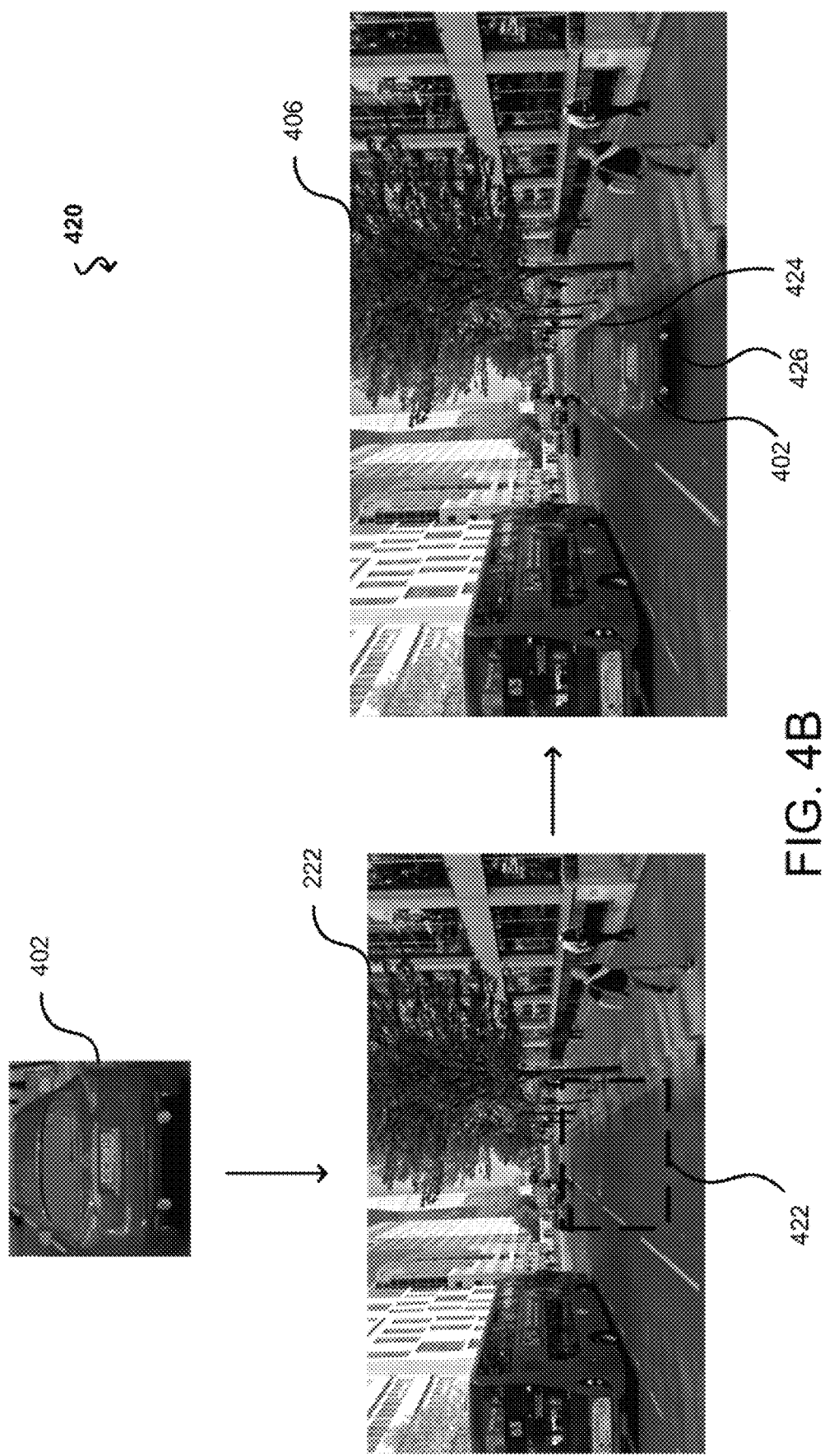
FIG. 4B illustrates an example representation of a virtual object inserted into a scene, according to at least one embodiment.

FIG. 4B illustrates an example representation 420 of the virtual object 402 inserted into a scene. In this example, the virtual object 402 is of a car that is inserted into a scene of the input image 222, which in this example is a roadway. A location 422 within the image 222 is designated for the virtual object 402. As shown, the image 22 includes a variety of lighting effects, such as shadows, reflections, and the like.

The output 406 illustrates the virtual object 402 arranged at the location 422. Furthermore, through the inclusion of the hybrid lighting model described herein, various lighting effects may be applied to the virtual object 402 to provide a more realistic presentation. For example, a reflection 424 is shown on a window of the virtual object 402. Additionally, a shadow 426 is shown under the virtual object 402. This spatially-varying lighting effects are provided, at least in part, by the lighting volume that is combined with the HDR sky dome in the hybrid lighting model. In this manner, different scenes can be generated having realistic lighting effects.

Figure 5A:
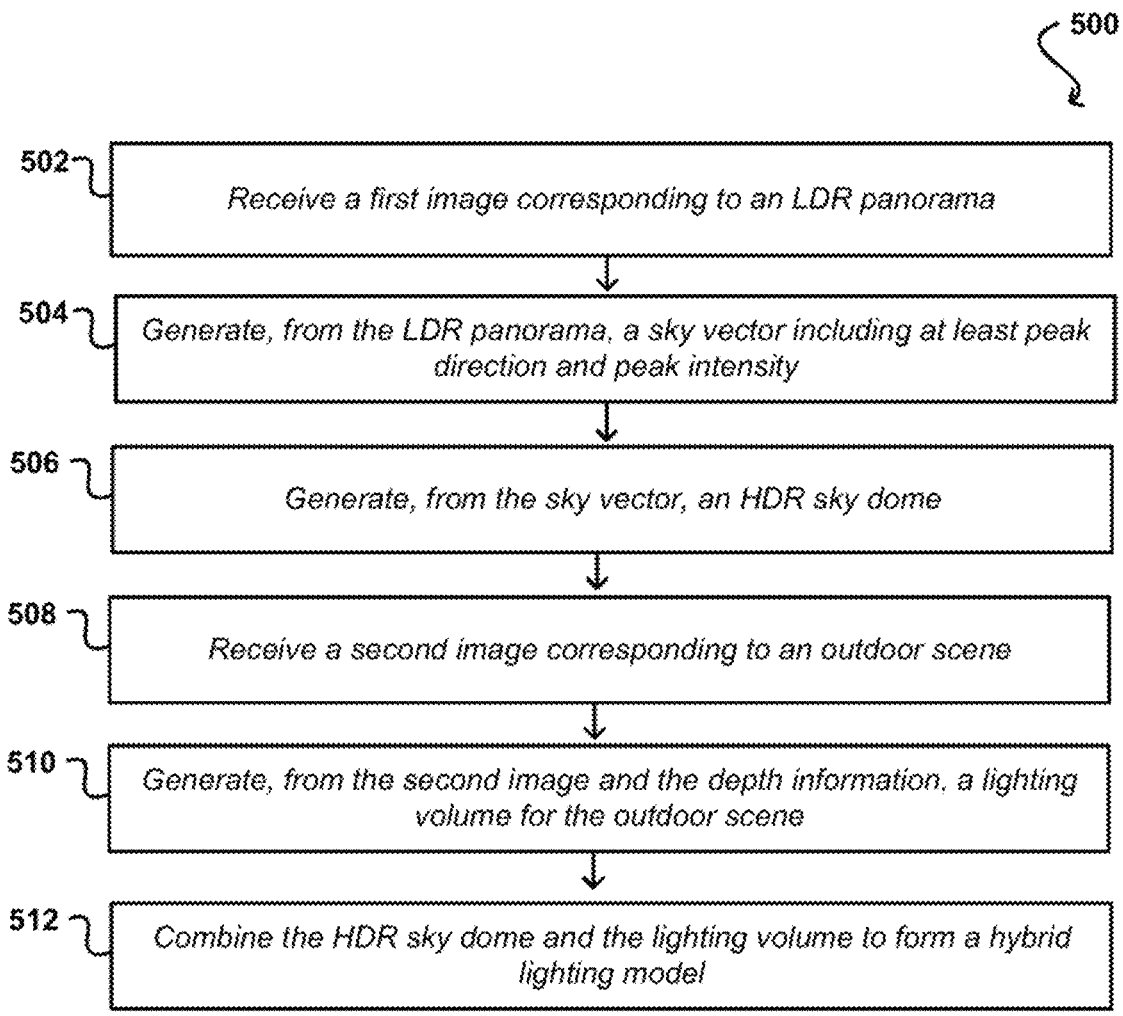
FIG. 5A illustrates an example flow chart of a process for generating a hybrid lighting model, according to at least one embodiment.

FIG. 5A illustrates an example process 500 for generating a hybrid lighting model. It should be understood that for this and other processes presented herein that there can be additional, fewer, or alternative steps performed in similar or alternative order, or at least partially in parallel, within the scope of various embodiments unless otherwise specifically stated. In this example, a first image is received for generation of a hybrid lighting model 502. The first image may be an LDR panorama of an outdoor scene, where the image may depict, at least in part, features associated with a sky. A sky encoder may be used to generate, from the first image, a sky vector 504. The sky vector may represent information such as sky latency, peak direction, and/or peak intensity. These features may then be used to generate an HDR sky dome 506, for example using a sky decoder. The HDR sky dome may be representative of an environmental lighting model for an outdoor scene.

In at least one embodiment, a second image is received 508, where the second image may correspond to an outdoor scene. As will be described, the second image may be an image that will be used for rendering and insertion of one or more virtual objects. Additionally, in certain embodiments, depth information may be obtained from the second image. The depth information may be estimated or may be provided, for example from one or more sensors. A lighting volume is generated from the second image and depth information 510. The lighting volume may correspond to local lighting effects, such as shadows, within the scene. The HDR sky dome and the lighting volume may then be combined to form a hybrid lighting model 512, where the hybrid lighting model allows for lighting of objects by considering both the intensity of the sun along with the localized shadow effects caused by object insertion into a scene.

Figure 5B:
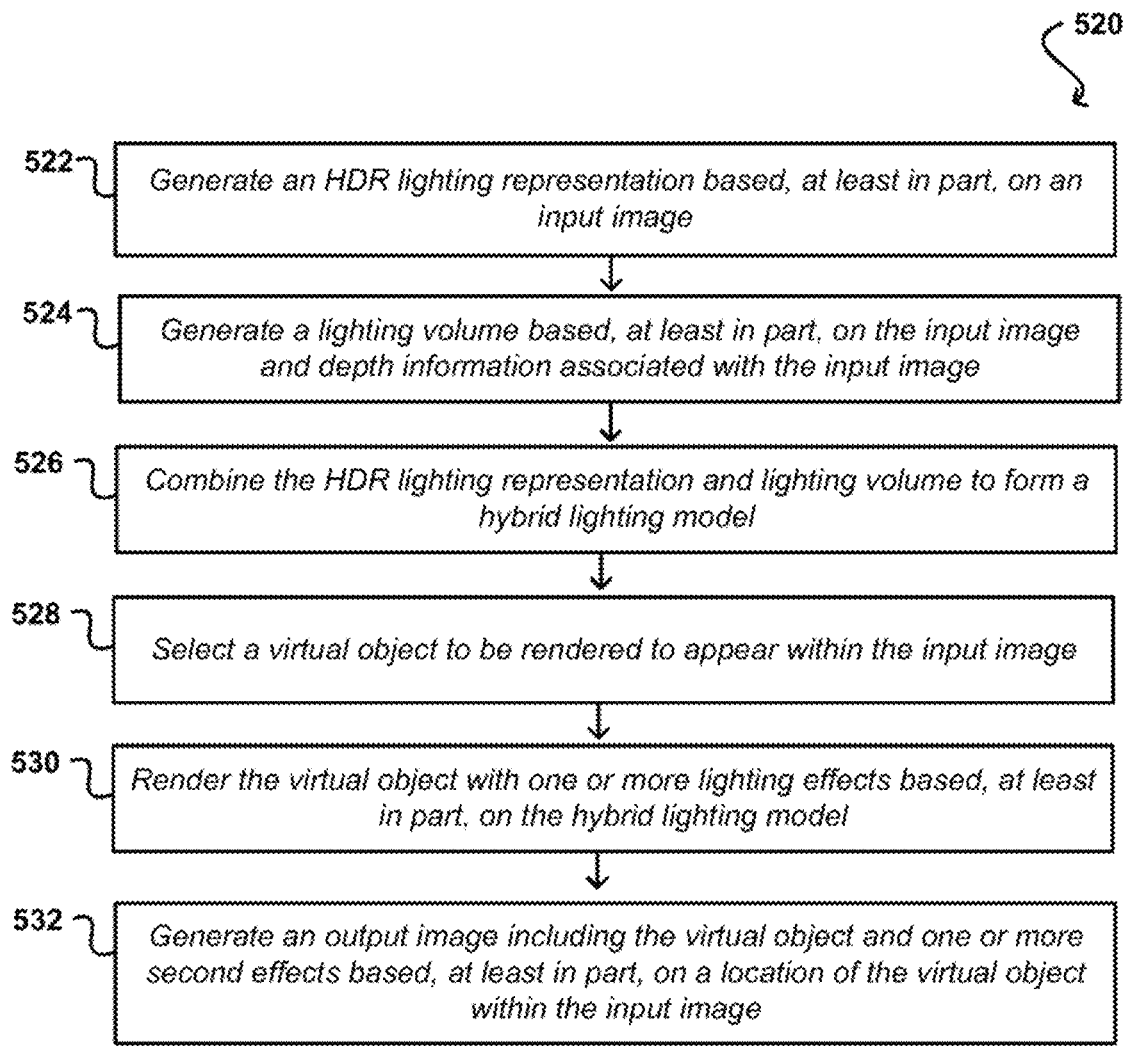
FIG. 5B illustrates an example flow chart of a process for generating a rendered image using a hybrid lighting model, according to at least one embodiment.

FIG. 5B illustrates an example process 520 for generating a hybrid lighting model and using the hybrid lighting model to render a virtual object within an image. In this example, an HDR lighting representation is generated based on an input image 522. For example, the HDR lighting representation may correspond to an HDR sky dome. A lighting volume is also generated, based at least in part on the input image and depth information for the input image 524. The lighting volume may be associated with localized effects and/or shadows. The lighting volume and HDR lighting representation may be combined to form a hybrid lighting model 526. This hybrid lighting model may then be passed or otherwise used by a differential object insertion module.

In at least one embodiment, a virtual object is selected for rendering within the image 528. The virtual object is then rendered with one or more lighting effects based, at least in part, on the hybrid lighting model 530. For example, a shadow may be cast over the object or light may reflect off of a window, among other options. An output image may be generated 532. The output image may include the inserted rendered object within the input image as if the object were natively in the image. Additionally, the output image may also include secondary effects based, at least in part, on a location of the virtual object within the input image. For example, the secondary effects may include a shadow cast on another object due to the addition of the virtual object. As another example, the secondary effects may include a reflection of the virtual object off of an adjacent object. In this manner, virtual objects may be added to scenes, which may be helpful for renderings to illustrate how items may look or to generate training data to train one or more machine learning systems.

Figure 6:
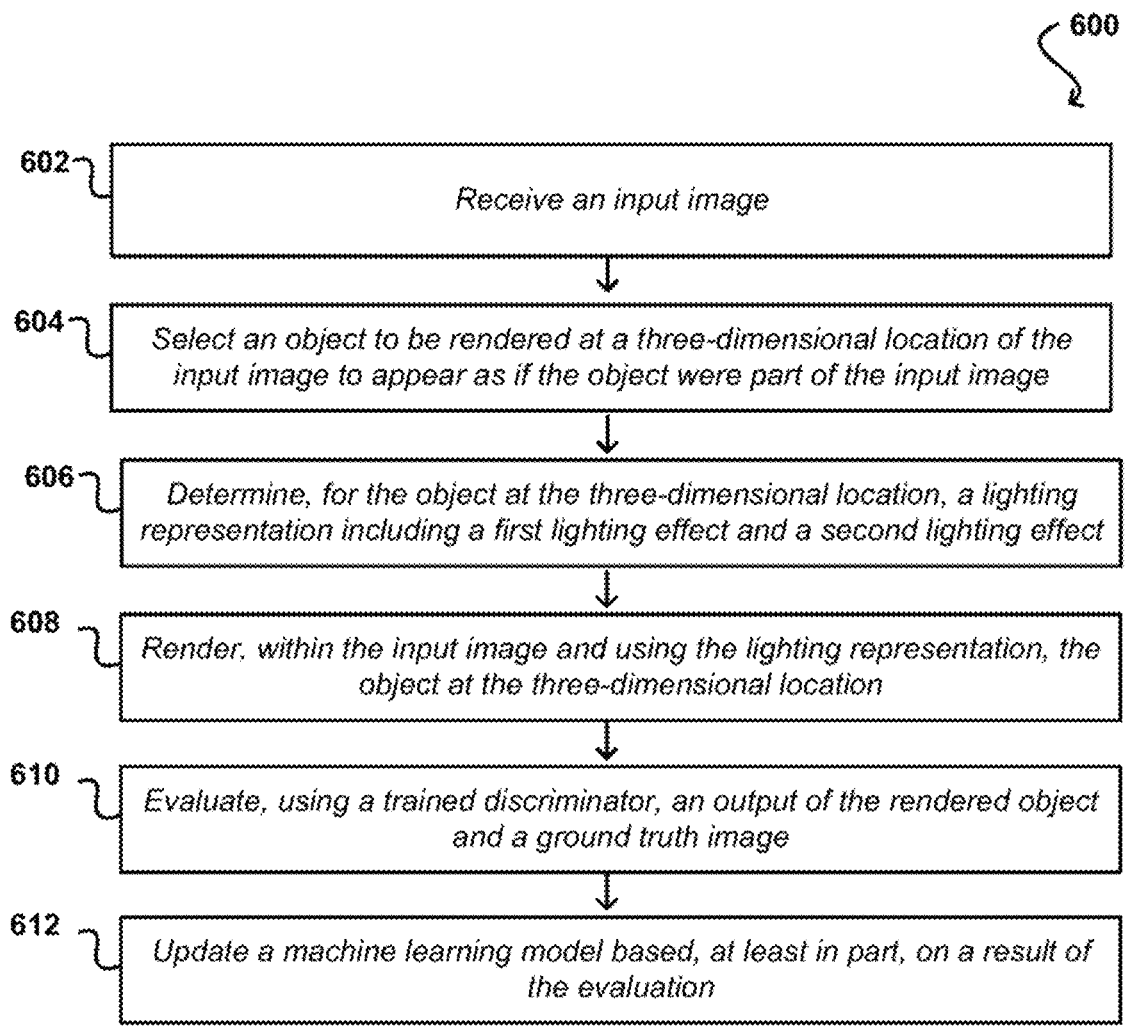
FIG. 6 illustrates an example flow chart of a process for generating a rendered image using a hybrid lighting model, according to at least one embodiment.

FIG. 6 illustrates an example process 600 for rendering an object within an image. In this example, an input image is received 602 and an object is selected for rendering to appear as if the object is in the input image 604. For example, the object may be a 3D object that is positioned at a 3D location within the input image. A 3D location for the object may be determined along with an associated lighting representation that includes a first effect and a second effect 606. The first effect may be due to a first light source, such as the sun, and the second effect may be due to the object and/or other objects within the input image, such as a reflection from a window or a shadow. The object may be rendered to appear as if the object were in the input image 608. The rendered appearance of the input image may then be provided to a trained discriminator for evaluation against ground truth information 610. The discriminator may then be used to label or otherwise identify which image is a "real" image and which is "fake." The analysis may be provided back to a machine learning system to update one or more parameters 612 (e.g., weights and biases).

Data Center

Figure 7:
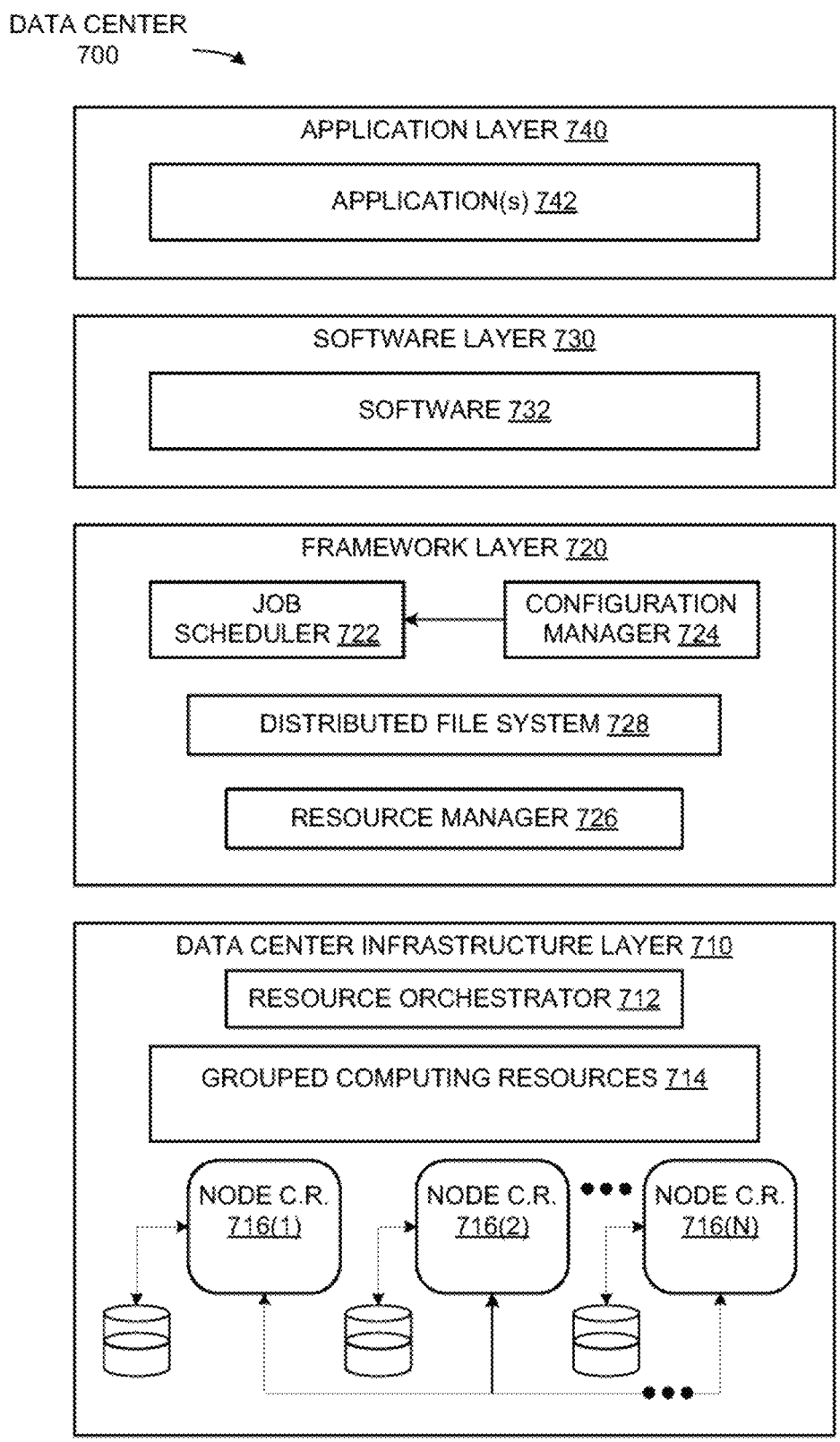
FIG. 7 illustrates an example data center system, according to at least one embodiment.

FIG. 7 illustrates an example data center 700, in which at least one embodiment may be used. In at least one embodiment, data center 700 includes a data center infrastructure layer 710, a framework layer 720, a software layer 730, and an application layer 740.

In at least one embodiment, as shown in FIG. 7, data center infrastructure layer 710 may include a resource orchestrator 712, grouped computing resources 714, and node computing resources ("node C.R.s") 716(1)-716(N), where "N" represents any whole, positive integer. In at least one embodiment, node C.R.s 716(1)-716(N) may include, but are not limited to, any number of central processing units ("CPUs") or other processors (including accelerators, field programmable gate arrays (FPGAs), graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 716(1)-716(N) may be a server having one or more of above-mentioned computing resources.

In at least one embodiment, grouped computing resources 714 may include separate groupings of node C.R.s housed within one or more racks (not shown), or many racks housed in data centers at various geographical locations (also not shown). Separate groupings of node C.R.s within grouped computing resources 714 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 712 may configure or otherwise control one or more node C.R.s 716(1)-716(N) and/or grouped computing resources 714. In at least one embodiment, resource orchestrator 712 may include a software design infrastructure ("SDI") management entity for data center 700. In at least one embodiment, resource orchestrator may include hardware, software or some combination thereof.

In at least one embodiment, as shown in FIG. 7, framework layer 720 includes a job scheduler 722, a configuration manager 724, a resource manager 726 and a distributed file system 728. In at least one embodiment, framework layer 720 may include a framework to support software 732 of software layer 730 and/or one or more application(s) 742 of application layer 740. In at least one embodiment, software 732 or application(s) 742 may respectively include web-based service software or applications, such as those provided by Amazon Web Services, Google Cloud and Microsoft Azure. In at least one embodiment, framework layer 720 may be, but is not limited to, a type of free and open-source software web application framework such as Apache Spark™ (hereinafter "Spark") that may use distributed file system 728 for large-scale data processing (e.g., "big data"). In at least one embodiment, job scheduler 722 may include a Spark driver to facilitate scheduling of workloads supported by various layers of data center 700. In at least one embodiment, configuration manager 724 may be capable of configuring different layers such as software layer 730 and framework layer 720 including Spark and distributed file system 728 for supporting large-scale data processing. In at least one embodiment, resource manager 726 may be capable of managing clustered or grouped computing resources mapped to or allocated for support of distributed file system 728 and job scheduler 722. In at least one embodiment, clustered or grouped computing resources may include grouped computing resource 714 at data center infrastructure layer 710. In at least one embodiment, resource manager 726 may coordinate with resource orchestrator 712 to manage these mapped or allocated computing resources.

In at least one embodiment, software 732 included in software layer 730 may include software used by at least portions of node C.R.s 716(1)-716(N), grouped computing resources 714, and/or distributed file system 728 of framework layer 720. The one or more types of software may include, but are not limited to, Internet web page search software, e-mail virus scan software, database software, and streaming video content software.

In at least one embodiment, application(s) 742 included in application layer 740 may include one or more types of applications used by at least portions of node C.R.s 716(1)-716(N), grouped computing resources 714, and/or distributed file system 728 of framework layer 720. One or more types of applications may include, but are not limited to, any number of a genomics application, a cognitive compute, and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 724, resource manager 726, and resource orchestrator 712 may implement any number and type of self-modifying actions based on any amount and type of data acquired in any technically feasible fashion. In at least one embodiment, self-modifying actions may relieve a data center operator of data center 700 from making possibly bad configuration decisions and possibly avoiding underutilized and/or poor performing portions of a data center.

In at least one embodiment, data center 700 may include tools, services, software or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 700. In at least one embodiment, trained machine learning models corresponding to one or more neural networks may be used to infer or predict information using resources described above with respect to data center 700 by using weight parameters calculated through one or more training techniques described herein.

In at least one embodiment, data center may use CPUs, application-specific integrated circuits (ASICs), GPUs, FPGAs, or other hardware to perform training and/or inferencing using above-described resources. Moreover, one or more software and/or hardware resources described above may be configured as a service to allow users to train or performing inferencing of information, such as image recognition, speech recognition, or other artificial intelligence services.

Such components can be used for rendering objects within images.

Computer Systems

Figure 8:
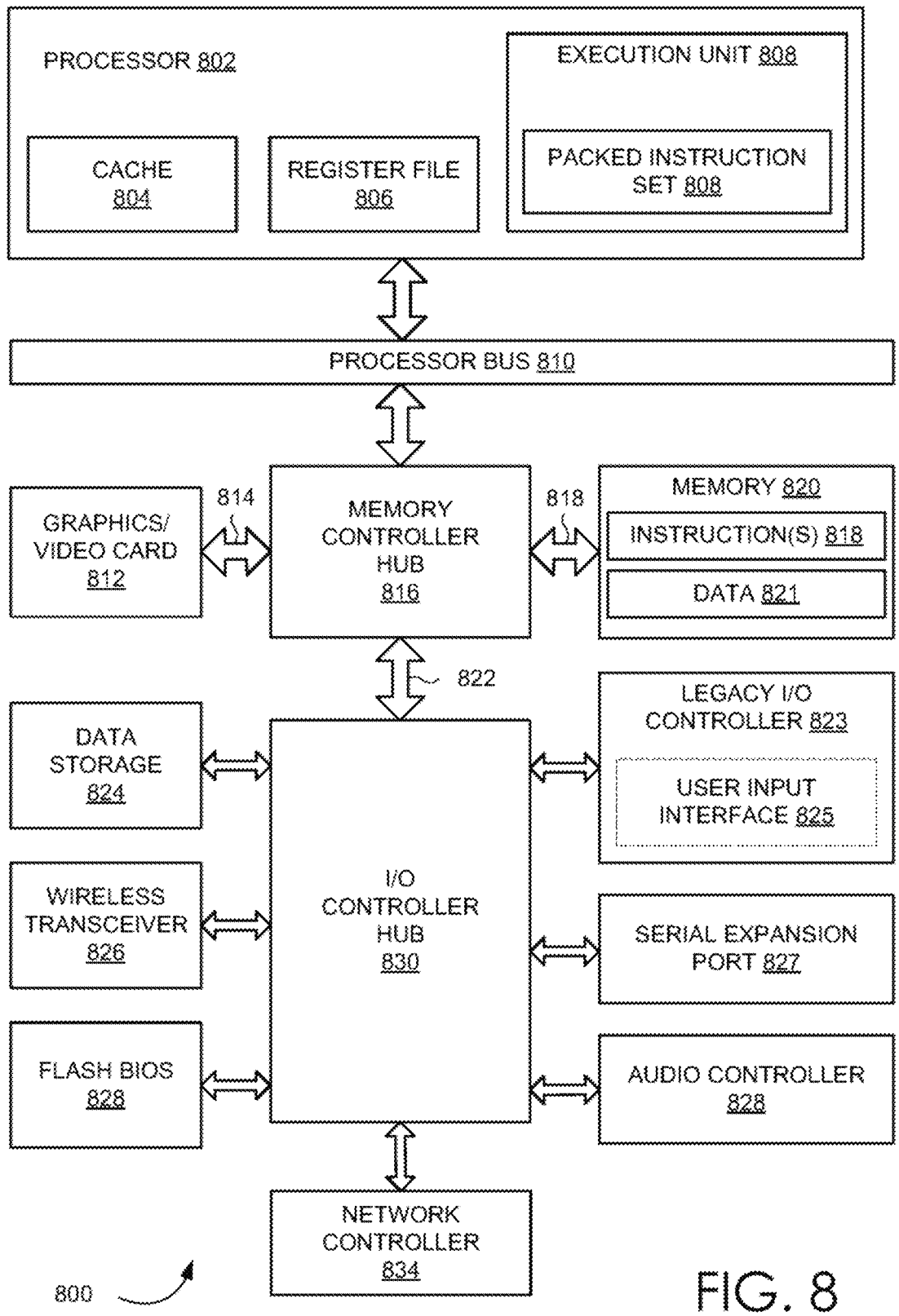
FIG. 8 illustrates a computer system, according to at least one embodiment.

FIG. 8 is a block diagram illustrating an exemplary computer system, which may be a system with interconnected devices and components, a system-on-a-chip (SOC) or some combination thereof 800 formed with a processor that may include execution units to execute an instruction, according to at least one embodiment. In at least one embodiment, computer system 800 may include, without limitation, a component, such as a processor 802 to employ execution units including logic to perform algorithms for process data, in accordance with present disclosure, such as in embodiment described herein. In at least one embodiment, computer system 800 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 800 may execute a version of WINDOWS' operating system available from Microsoft Corporation of Redmond, Wash., although other operating systems (UNIX and Linux for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), system on a chip, network computers ("NetPCs"), edge computing devices, set-top boxes, network hubs, wide area network ("WAN") switches, or any other system that may perform one or more instructions in accordance with at least one embodiment.

Embodiments of the systems and methods described herein may be used for a variety of purposes, by way of example and without limitation, for machine control, machine locomotion, machine driving, synthetic data generation, digital twinning, model training, perception, augmented reality, virtual reality, mixed reality, robotics, security and surveillance, autonomous or semi-autonomous machine applications, deep learning, environment simulation, data center processing, conversational AI, light transport simulation (e.g., ray-tracing, path tracing, etc.), collaborative content creation for 3D assets, cloud computing and/or any other suitable applications.

Disclosed embodiments may be incorporated or integrated in a variety of different systems such as automotive systems (e.g., a human-machine interface for an autonomous or semi-autonomous machine), systems implemented using a robot, aerial systems, medial systems, boating systems, smart area monitoring systems, systems for performing deep learning operations, systems for performing simulation and digital twin operations, systems implemented using an edge device, systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems implemented at least partially using cloud computing resources, and/or other types of systems.

In at least one embodiment, computer system 800 may include, without limitation, processor 802 that may include, without limitation, one or more execution units 808 to perform machine learning model training and/or inferencing according to techniques described herein. In at least one embodiment, computer system 800 is a single processor desktop or server system, but in another embodiment computer system 800 may be a multiprocessor system. In at least one embodiment, processor 802 may include, without limitation, a complex instruction set computer ("CISC") microprocessor, a reduced instruction set computing ("RISC") microprocessor, a very long instruction word ("VLIW") microprocessor, a processor implementing a combination of instruction sets, or any other processor device, such as a digital signal processor, for example. In at least one embodiment, processor 802 may be coupled to a processor bus 810 that may transmit data signals between processor 802 and other components in computer system 800.

In at least one embodiment, processor 802 may include, without limitation, a Level 1 ("L1") internal cache memory ("cache") 804. In at least one embodiment, processor 802 may have a single internal cache or multiple levels of internal cache. In at least one embodiment, cache memory may reside external to processor 802. Other embodiments may also include a combination of both internal and external caches depending on particular implementation and needs. In at least one embodiment, register file 806 may store different types of data in various registers including, without limitation, integer registers, floating point registers, status registers, and instruction pointer register.

In at least one embodiment, execution unit 808, including, without limitation, logic to perform integer and floating point operations, also resides in processor 802. In at least one embodiment, processor 802 may also include a microcode ("ucode") read only memory ("ROM") that stores microcode for certain macro instructions. In at least one embodiment, execution unit 808 may include logic to handle a packed instruction set 809. In at least one embodiment, by including packed instruction set 809 in an instruction set of a general-purpose processor 802, along with associated circuitry to execute instructions, operations used by many multimedia applications may be performed using packed data in a general-purpose processor 802. In one or more embodiments, many multimedia applications may be accelerated and executed more efficiently by using full width of a processor's data bus for performing operations on packed data, which may eliminate need to transfer smaller units of data across processor's data bus to perform one or more operations one data element at a time.

In at least one embodiment, execution unit 808 may also be used in microcontrollers, embedded processors, graphics devices, DSPs, and other types of logic circuits. In at least one embodiment, computer system 800 may include, without limitation, a memory 820. In at least one embodiment, memory 820 may be implemented as a Dynamic Random Access Memory ("DRAM") device, a Static Random Access Memory ("SRAM") device, flash memory device, or other memory device. In at least one embodiment, memory 820 may store instruction(s) 819 and/or data 821 represented by data signals that may be executed by processor 802.

In at least one embodiment, system logic chip may be coupled to processor bus 810 and memory 820. In at least one embodiment, system logic chip may include, without limitation, a memory controller hub ("MCH") 816, and processor 802 may communicate with MCH 816 via processor bus 810. In at least one embodiment, MCH 816 may provide a high bandwidth memory path 818 to memory 820 for instruction and data storage and for storage of graphics commands, data and textures. In at least one embodiment, MCH 816 may direct data signals between processor 802, memory 820, and other components in computer system 800 and to bridge data signals between processor bus 810, memory 820, and a system I/O 822. In at least one embodiment, system logic chip may provide a graphics port for coupling to a graphics controller. In at least one embodiment, MCH 816 may be coupled to memory 820 through a high bandwidth memory path 818 and graphics/video card 812 may be coupled to MCH 816 through an Accelerated Graphics Port ("AGP") interconnect 814.

In at least one embodiment, computer system 800 may use system I/O 822 that is a proprietary hub interface bus to couple MCH 816 to I/O controller hub ("ICH") 830. In at least one embodiment, ICH 830 may provide direct connections to some I/O devices via a local I/O bus. In at least one embodiment, local I/O bus may include, without limitation, a high-speed I/O bus for connecting peripherals to memory 820, chipset, and processor 802. Examples may include, without limitation, an audio controller 829, a firmware hub ("flash BIOS") 828, a wireless transceiver 826, a data storage 824, a legacy I/O controller 823 containing user input and keyboard interfaces 825, a serial expansion port 827, such as Universal Serial Bus ("USB"), and a network controller 834. Data storage 824 may comprise a hard disk drive, a floppy disk drive, a CD-ROM device, a flash memory device, or other mass storage device.

In at least one embodiment, FIG. 8 illustrates a system, which includes interconnected hardware devices or "chips", whereas in other embodiments, FIG. 8 may illustrate an exemplary System on a Chip ("SoC"). In at least one embodiment, devices may be interconnected with proprietary interconnects, standardized interconnects (e.g., PCIe) or some combination thereof. In at least one embodiment, one or more components of computer system 800 are interconnected using compute express link (CXL) interconnects.

Such components can be used for rendering objects within images.

Figure 9:
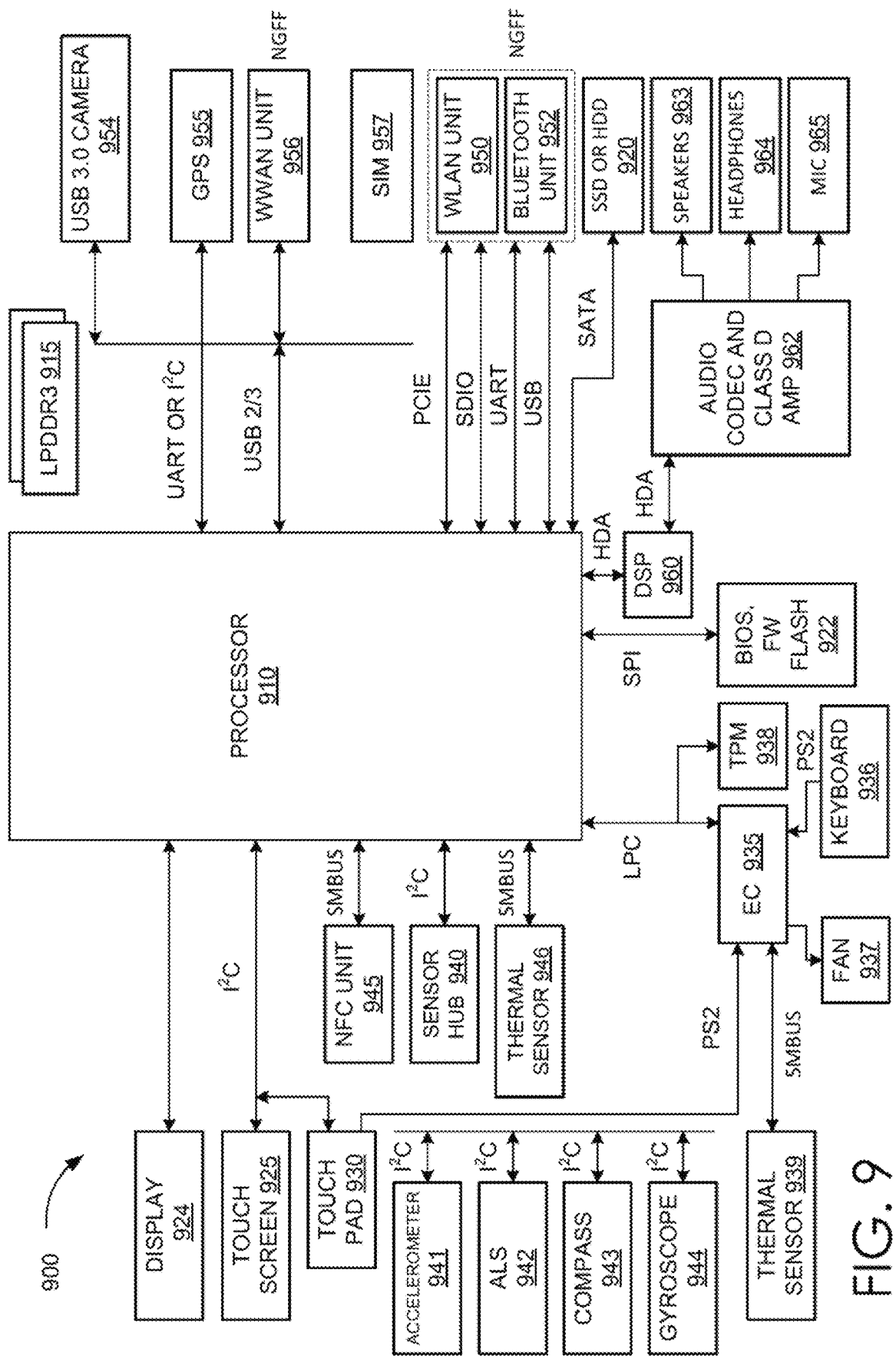
FIG. 9 illustrates a computer system, according to at least one embodiment.

FIG. 9 is a block diagram illustrating an electronic device 900 for utilizing a processor 910, according to at least one embodiment. In at least one embodiment, electronic device 900 may be, for example and without limitation, a notebook, a tower server, a rack server, a blade server, a laptop, a desktop, a tablet, a mobile device, a phone, an embedded computer, or any other suitable electronic device.

In at least one embodiment, system 900 may include, without limitation, processor 910 communicatively coupled to any suitable number or kind of components, peripherals, modules, or devices. In at least one embodiment, processor 910 coupled using a bus or interface, such as a 1° C. bus, a System Management Bus ("SMBus"), a Low Pin Count (LPC) bus, a Serial Peripheral Interface ("SPI"), a High Definition Audio ("HDA") bus, a Serial Advance Technology Attachment ("SATA") bus, a Universal Serial Bus ("USB") (versions 1, 2, 3), or a Universal Asynchronous Receiver/Transmitter ("UART") bus. In at least one embodiment, FIG. 9 illustrates a system, which includes interconnected hardware devices or "chips", whereas in other embodiments, FIG. 9 may illustrate an exemplary System on a Chip ("SoC"). In at least one embodiment, devices illustrated in FIG. 9 may be interconnected with proprietary interconnects, standardized interconnects (e.g., PCIe) or some combination thereof. In at least one embodiment, one or more components of FIG. 9 are interconnected using compute express link (CXL) interconnects.

In at least one embodiment, FIG. 9 may include a display 924, a touch screen 925, a touch pad 930, a Near Field Communications unit ("NFC") 945, a sensor hub 940, a thermal sensor 946, an Express Chipset ("EC") 935, a Trusted Platform Module ("TPM") 938, BIOS/firmware/flash memory ("BIOS, FW Flash") 922, a DSP 960, a drive 920 such as a Solid State Disk ("SSD") or a Hard Disk Drive ("HDD"), a wireless local area network unit ("WLAN") 950, a Bluetooth unit 952, a Wireless Wide Area Network unit ("WWAN") 956, a Global Positioning System (GPS) 955, a camera ("USB 3.0 camera") 954 such as a USB 3.0 camera, and/or a Low Power Double Data Rate ("LPDDR") memory unit ("LPDDR3") 915 implemented in, for example, LPDDR3 standard. These components may each be implemented in any suitable manner.

In at least one embodiment, other components may be communicatively coupled to processor 910 through components discussed above. In at least one embodiment, an accelerometer 941, Ambient Light Sensor ("ALS") 942, compass 943, and a gyroscope 944 may be communicatively coupled to sensor hub 940. In at least one embodiment, thermal sensor 939, a fan 937, a keyboard 946, and a touch pad 930 may be communicatively coupled to EC 935. In at least one embodiment, speaker 963, headphones 964, and microphone ("mic") 965 may be communicatively coupled to an audio unit ("audio codec and class d amp") 962, which may in turn be communicatively coupled to DSP 960. In at least one embodiment, audio unit 964 may include, for example and without limitation, an audio coder/decoder ("codec") and a class D amplifier. In at least one embodiment, SIM card ("SIM") 957 may be communicatively coupled to WWAN unit 956. In at least one embodiment, components such as WLAN unit 950 and Bluetooth unit 952, as well as WWAN unit 956 may be implemented in a Next Generation Form Factor ("NGFF").

Such components can be used for rendering objects within images.

Figure 10:
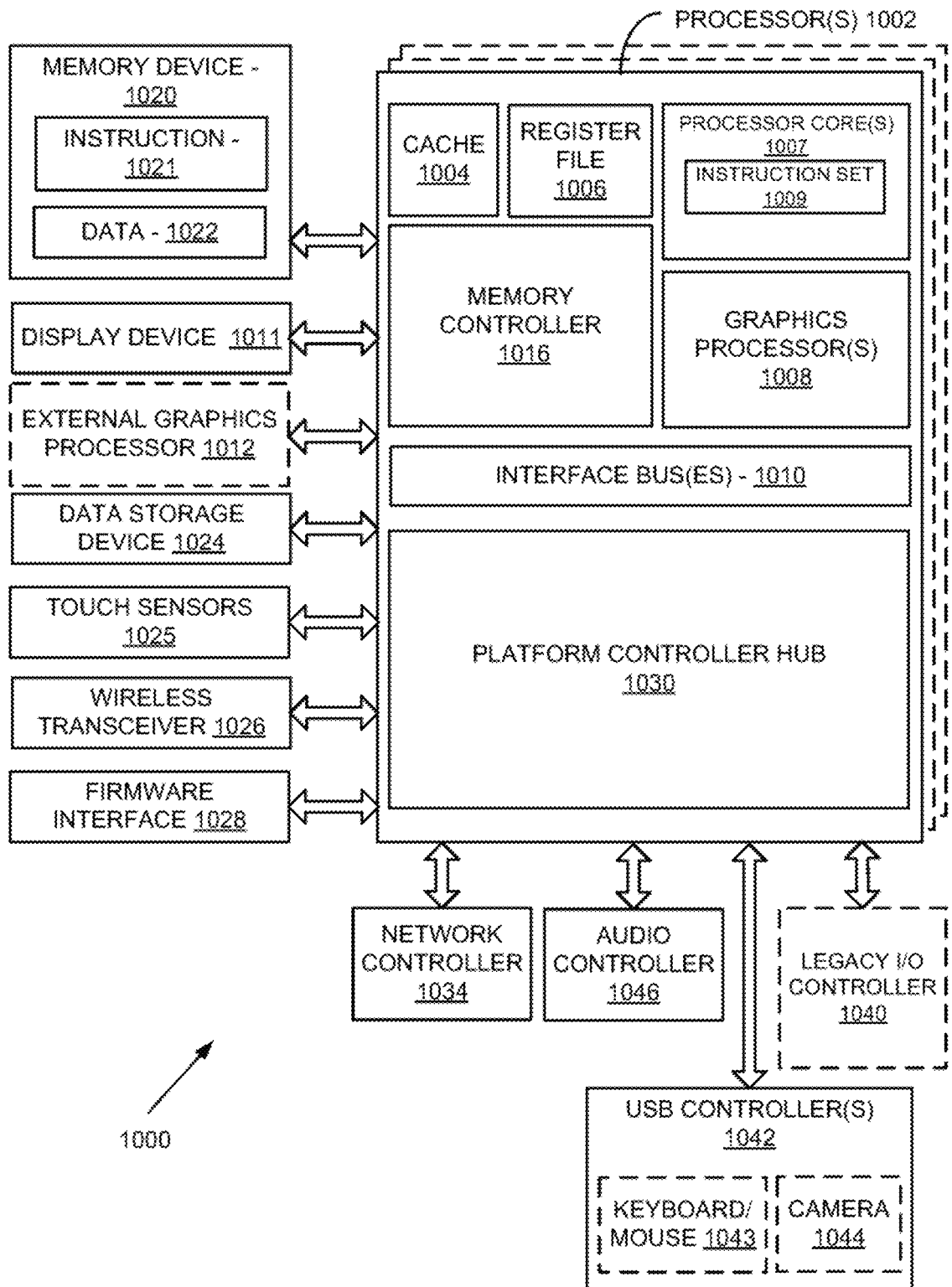
FIG. 10 illustrates at least portions of a graphics processor, according to one or more embodiments.

FIG. 10 is a block diagram of a processing system, according to at least one embodiment. In at least one embodiment, system 1000 includes one or more processors 1002 and one or more graphics processors 1008, and may be a single processor desktop system, a multiprocessor workstation system, or a server system or datacenter having a large number of collectively or separably managed processors 1002 or processor cores 1007. In at least one embodiment, system 1000 is a processing platform incorporated within a system-on-a-chip (SoC) integrated circuit for use in mobile, handheld, or embedded devices.

In at least one embodiment, system 1000 can include, or be incorporated within a server-based gaming platform, a cloud computing host platform, a virtualized computing platform, a game console, including a game and media console, a mobile gaming console, a handheld game console, or an online game console. In at least one embodiment, system 1000 is a mobile phone, smart phone, tablet computing device or mobile Internet device. In at least one embodiment, processing system 1000 can also include, couple with, or be integrated within a wearable device, such as a smart watch wearable device, smart eyewear device, augmented reality device, edge device, Internet of Things ("IoT") device, or virtual reality device. In at least one embodiment, processing system 1000 is a television or set top box device having one or more processors 1002 and a graphical interface generated by one or more graphics processors 1008.

In at least one embodiment, one or more processors 1002 each include one or more processor cores 1007 to process instructions which, when executed, perform operations for system and user software. In at least one embodiment, each of one or more processor cores 1007 is configured to process a specific instruction set 1009. In at least one embodiment, instruction set 1009 may facilitate Complex Instruction Set Computing (CISC), Reduced Instruction Set Computing (RISC), or computing via a Very Long Instruction Word (VLIW). In at least one embodiment, processor cores 1007 may each process a different instruction set 1009, which may include instructions to facilitate emulation of other instruction sets. In at least one embodiment, processor core 1007 may also include other processing devices, such a Digital Signal Processor (DSP).

In at least one embodiment, processor 1002 includes cache memory 1004. In at least one embodiment, processor 1002 can have a single internal cache or multiple levels of internal cache. In at least one embodiment, cache memory is shared among various components of processor 1002. In at least one embodiment, processor 1002 also uses an external cache (e.g., a Level-3 (L3) cache or Last Level Cache (LLC)) (not shown), which may be shared among processor cores 1007 using known cache coherency techniques. In at least one embodiment, register file 1006 is additionally included in processor 1002 which may include different types of registers for storing different types of data (e.g., integer registers, floating point registers, status registers, and an instruction pointer register). In at least one embodiment, register file 1006 may include general-purpose registers or other registers.

In at least one embodiment, one or more processor(s) 1002 are coupled with one or more interface bus(es) 1010 to transmit communication signals such as address, data, or control signals between processor 1002 and other components in system 1000. In at least one embodiment, interface bus 1010, in one embodiment, can be a processor bus, such as a version of a Direct Media Interface (DMI) bus. In at least one embodiment, interface 1010 is not limited to a DMI bus, and may include one or more Peripheral Component Interconnect buses (e.g., PCI, PCI Express), memory busses, or other types of interface busses. In at least one embodiment processor(s) 1002 include an integrated memory controller 1016 and a platform controller hub 1030. In at least one embodiment, memory controller 1016 facilitates communication between a memory device and other components of system 1000, while platform controller hub (PCH) 1030 provides connections to I/O devices via a local I/O bus.

In at least one embodiment, memory device 1020 can be a dynamic random access memory (DRAM) device, a static random access memory (SRAM) device, flash memory device, phase-change memory device, or some other memory device having suitable performance to serve as process memory. In at least one embodiment memory device 1020 can operate as system memory for system 1000, to store data 1022 and instructions 1021 for use when one or more processors 1002 executes an application or process. In at least one embodiment, memory controller 1016 also couples with an optional external graphics processor 1012, which may communicate with one or more graphics processors 1008 in processors 1002 to perform graphics and media operations. In at least one embodiment, a display device 1011 can connect to processor(s) 1002. In at least one embodiment display device 1011 can include one or more of an internal display device, as in a mobile electronic device or a laptop device or an external display device attached via a display interface (e.g., DisplayPort, etc.). In at least one embodiment, display device 1011 can include a head mounted display (HMD) such as a stereoscopic display device for use in virtual reality (VR) applications or augmented reality (AR) applications.

In at least one embodiment, platform controller hub 1030 enables peripherals to connect to memory device 1020 and processor 1002 via a high-speed I/O bus. In at least one embodiment, I/O peripherals include, but are not limited to, an audio controller 1046, a network controller 1034, a firmware interface 1028, a wireless transceiver 1026, touch sensors 1025, a data storage device 1024 (e.g., hard disk drive, flash memory, etc.). In at least one embodiment, data storage device 1024 can connect via a storage interface (e.g., SATA) or via a peripheral bus, such as a Peripheral Component Interconnect bus (e.g., PCI, PCI Express). In at least one embodiment, touch sensors 1025 can include touch screen sensors, pressure sensors, or fingerprint sensors. In at least one embodiment, wireless transceiver 1026 can be a Wi-Fi transceiver, a Bluetooth transceiver, or a mobile network transceiver such as a 3G, 4G, or Long Term Evolution (LTE) transceiver. In at least one embodiment, firmware interface 1028 enables communication with system firmware, and can be, for example, a unified extensible firmware interface (UEFI). In at least one embodiment, network controller 1034 can enable a network connection to a wired network. In at least one embodiment, a high-performance network controller (not shown) couples with interface bus 1010. In at least one embodiment, audio controller 1046 is a multi-channel high definition audio controller. In at least one embodiment, system 1000 includes an optional legacy I/O controller 1040 for coupling legacy (e.g., Personal System 2 (PS/2)) devices to system. In at least one embodiment, platform controller hub 1030 can also connect to one or more Universal Serial Bus (USB) controllers 1042 connect input devices, such as keyboard and mouse 1043 combinations, a camera 1044, or other USB input devices.

In at least one embodiment, an instance of memory controller 1016 and platform controller hub 1030 may be integrated into a discreet external graphics processor, such as external graphics processor 1012. In at least one embodiment, platform controller hub 1030 and/or memory controller 1016 may be external to one or more processor(s) 1002. For example, in at least one embodiment, system 1000 can include an external memory controller 1016 and platform controller hub 1030, which may be configured as a memory controller hub and peripheral controller hub within a system chipset that is in communication with processor(s) 1002.

Such components can be used for rendering objects within images.

Figure 11:
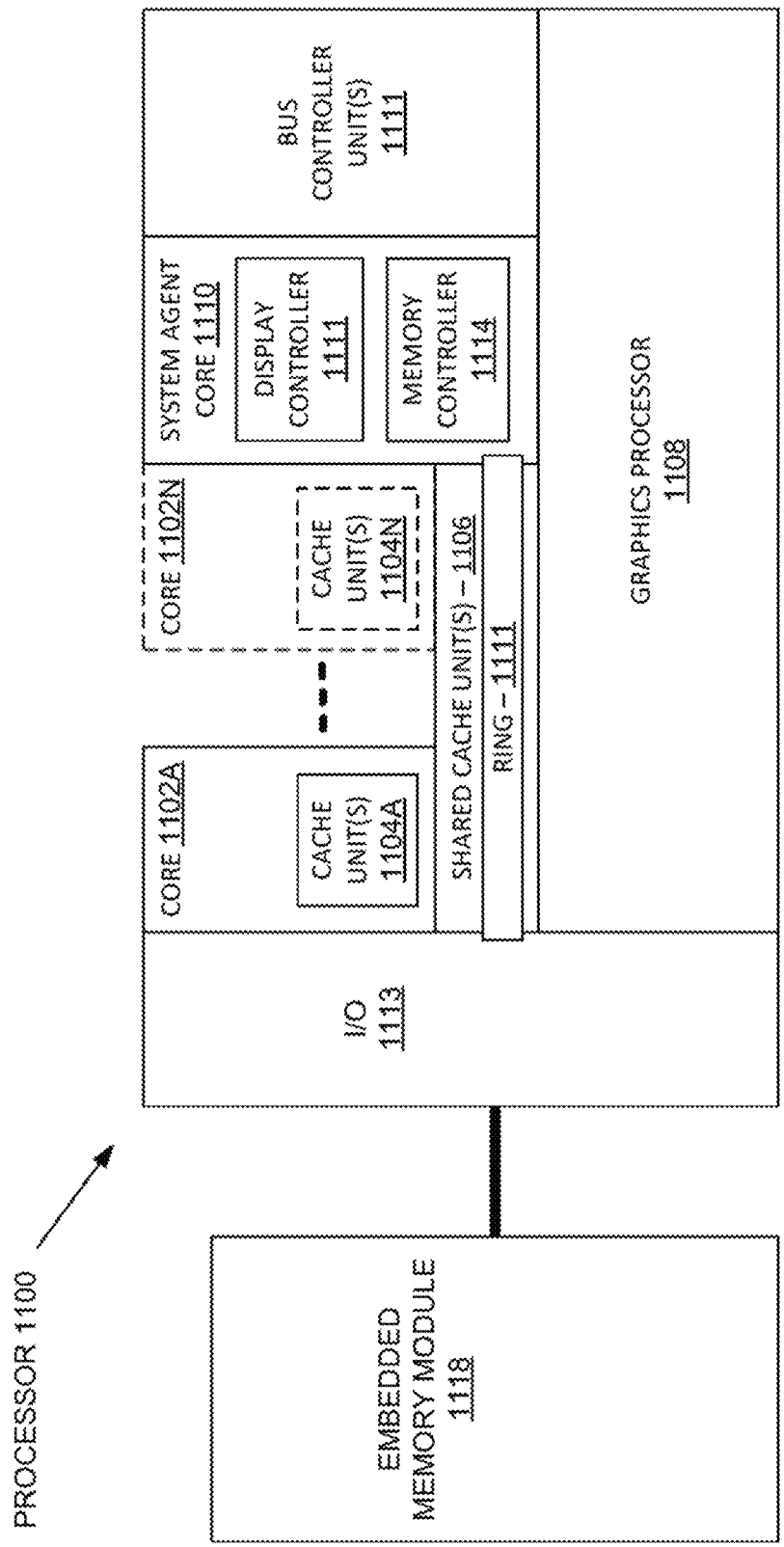
FIG. 11 illustrates at least portions of a graphics processor, according to one or more embodiments.

FIG. 11 is a block diagram of a processor 1100 having one or more processor cores 1102A-1102N, an integrated memory controller 1114, and an integrated graphics processor 1108, according to at least one embodiment. In at least one embodiment, processor 1100 can include additional cores up to and including additional core 1102N represented by dashed lined boxes. In at least one embodiment, each of processor cores 1102A-1102N includes one or more internal cache units 1104A-1104N. In at least one embodiment, each processor core also has access to one or more shared cached units 1106.

In at least one embodiment, internal cache units 1104A-1104N and shared cache units 1106 represent a cache memory hierarchy within processor 1100. In at least one embodiment, cache memory units 1104A-1104N may include at least one level of instruction and data cache within each processor core and one or more levels of shared mid-level cache, such as a Level 2 (L2), Level 3 (L3), Level 4 (L4), or other levels of cache, where a highest level of cache before external memory is classified as an LLC. In at least one embodiment, cache coherency logic maintains coherency between various cache units 1106 and 1104A-1104N.

In at least one embodiment, processor 1100 may also include a set of one or more bus controller units 1116 and a system agent core 1110. In at least one embodiment, one or more bus controller units 1116 manage a set of peripheral buses, such as one or more PCI or PCI express busses. In at least one embodiment, system agent core 1110 provides management functionality for various processor components. In at least one embodiment, system agent core 1110 includes one or more integrated memory controllers 1114 to manage access to various external memory devices (not shown).

In at least one embodiment, one or more of processor cores 1102A-1102N include support for simultaneous multi-threading. In at least one embodiment, system agent core 1110 includes components for coordinating and operating cores 1102A-1102N during multi-threaded processing. In at least one embodiment, system agent core 1110 may additionally include a power control unit (PCU), which includes logic and components to regulate one or more power states of processor cores 1102A-1102N and graphics processor 1108.

In at least one embodiment, processor 1100 additionally includes graphics processor 1108 to execute graphics processing operations. In at least one embodiment, graphics processor 1108 couples with shared cache units 1106, and system agent core 1110, including one or more integrated memory controllers 1114. In at least one embodiment, system agent core 1110 also includes a display controller 1111 to drive graphics processor output to one or more coupled displays. In at least one embodiment, display controller 1111 may also be a separate module coupled with graphics processor 1108 via at least one interconnect, or may be integrated within graphics processor 1108.

In at least one embodiment, a ring based interconnect unit 1112 is used to couple internal components of processor 1100. In at least one embodiment, an alternative interconnect unit may be used, such as a point-to-point interconnect, a switched interconnect, or other techniques. In at least one embodiment, graphics processor 1108 couples with ring interconnect 1112 via an I/O link 1113.

In at least one embodiment, I/O link 1113 represents at least one of multiple varieties of I/O interconnects, including an on package I/O interconnect which facilitates communication between various processor components and a high-performance embedded memory module 1118, such as an eDRAM module. In at least one embodiment, each of processor cores 1102A-1102N and graphics processor 1108 use embedded memory modules 1118 as a shared Last Level Cache.

In at least one embodiment, processor cores 1102A-1102N are homogenous cores executing a common instruction set architecture. In at least one embodiment, processor cores 1102A-1102N are heterogeneous in terms of instruction set architecture (ISA), where one or more of processor cores 1102A-1102N execute a common instruction set, while one or more other cores of processor cores 1102A-1102N executes a subset of a common instruction set or a different instruction set. In at least one embodiment, processor cores 1102A-1102N are heterogeneous in terms of microarchitecture, where one or more cores having a relatively higher power consumption couple with one or more power cores having a lower power consumption. In at least one embodiment, processor 1100 can be implemented on one or more chips or as an SoC integrated circuit.

Such components can be used for rendering objects within images.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. Term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. Use of term "set" (e.g., "a set of items") or "subset," unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B, and at least one of C each to be present. In addition, unless otherwise noted or contradicted by context, term "plurality" indicates a state of being plural (e.g., "a plurality of items" indicates multiple items). A plurality is at least two items, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. A set of non-transitory computer-readable storage media, in at least one embodiment, comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") and/or a data processing unit ("DPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be any processor capable of general purpose processing such as a CPU, GPU, or DPU. As non-limiting examples, "processor" may be any microcontroller or dedicated processing unit such as a DSP, image signal processor ("ISP"), arithmetic logic unit ("ALU"), vision processing unit ("VPU"), tree traversal unit ("TTU"), ray tracing core, tensor tracing core, tensor processing unit ("TPU"), embedded control unit ("ECU"), and the like. As non-limiting examples, "processor" may be a hardware accelerator, such as a PVA (programmable vision accelerator), DLA (deep learning accelerator), etc. As non-limiting examples, "processor" may also include one or more virtual instances of a CPU, GPU, etc., hosted on an underlying hardware component executing one or more virtual machines. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. Terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. Obtaining, acquiring, receiving, or inputting analog and digital data can be accomplished in a variety of ways such as by receiving data as a parameter of a function call or a call to an application programming interface. In some implementations, process of obtaining, acquiring, receiving, or inputting analog or digital data can be accomplished by transferring data via a serial or parallel interface. In another implementation, process of obtaining, acquiring, receiving, or inputting analog or digital data can be accomplished by transferring data via a computer network from providing entity to acquiring entity. References may also be made to providing, outputting, transmitting, sending, or presenting analog or digital data. In various examples, process of providing, outputting, transmitting, sending, or presenting analog or digital data can be accomplished by transferring data as an input or output parameter of a function call, a parameter of an application programming interface or interprocess communication mechanism.

Although discussion above sets forth example implementations of described techniques, other architectures may be used to implement described functionality, and are intended to be within scope of this disclosure. Furthermore, although specific distributions of responsibilities are defined above for purposes of discussion, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A system, comprising:
    one or more processing units to:
        compute, using one or more neural networks and based at least on image data representative of an image depicting a scene, a hybrid lighting representation and a volumetric lighting representation for a five-dimensional (5D) light field for three-dimensional (3D) points within the scene;
        generate, using one or more light transport simulation algorithms and based at least on the hybrid lighting representation, a rendering of a virtual object and second-order lighting effects associated with a position of the virtual object within the scene; and
        generate an augmented image that depicts the rendering of the virtual object depicted within the image at the position and the second-order lighting effects.

2. The system of claim 1, wherein the generating the augmented image includes executing one or more second light transport simulation algorithms with respect to the virtual object within the scene to determine one or more pixel values of one or more pixels of the augmented image.

3. The system of claim 1, wherein the image is a single monocular image.

4. The system of claim 1, wherein the one or more processing units are further to:
    determine, using a panoramic image, a sky feature vector; and
    generate, based at least in part on the sky feature vector, a sky dome.

5. The system of claim 4, wherein the sky feature vector is indicative of at least one of a peak intensity value, a peak direction value, or a latent vector.

6. The system of claim 1, wherein the augmented image further includes an adjustment to one or more pixel values of one or more pixels corresponding to a background of the image, the adjustment being applied based at least in part on a presence of the virtual object in the scene.

7. The system of claim 1, wherein the one or more processing units are further to:
    receive one or more high dynamic range (HDR) panoramic images corresponding to one or more outdoor scenes;
    determine, for at least one HDR panoramic image of the one or more HDR panoramic images, a peak intensity and a direction;
    generate, for the at least one HDR panoramic image of the one or more HDR panoramic images, a low dynamic range (LDR) panoramic image; and
    update one or more parameters of an encoder-decoder network based, at least in part, on the at least one HDR panoramic image and corresponding LDR panoramic image,
    wherein the one or more neural networks includes the encoder-decoder network.

8. The system of claim 1, wherein the one or more processing units are further to:
    generate one or more training images by, at least in part, rendering one or more virtual objects into one or more images;
    evaluate, using a discriminator, the one or more training images against ground truth data; and
    adjust one or more parameters of a scene generation model based, at least in part, on evaluating the one or more training images against the ground truth data.

9. The system of claim 1, wherein the hybrid lighting representation is further computed based at least on data representative of a depth map generated using the image.

10. The system of claim 1, wherein the system is comprised in at least one of:
    a human-machine interface system of an autonomous or semi-autonomous machine;
    a system for performing conversational AI operations;
    a system for performing simulation operations;
    a system for performing synthetic data generation or synthetic data augmentation;

a system for performing digital twin operations;
a system for performing deep learning operations;
a system implemented using an edge device;
a system implemented using a robot;
a system for performing collaborative content creation operations for 3D assets;
a system for generating graphical output for virtual reality systems, augmented reality systems, or mixed reality systems;
a system incorporating one or more virtual machines (VMs);
a system implemented at least partially in a data center; or
a system implemented at least partially using cloud computing resources.

11. A method, comprising:
generating, using a first neural network, a sky lighting representation based, at least in part, on a first image;
generating, using a second neural network, a volumetric lighting representation based, at least in part, on a lighting feature in the first image predicted by the first neural network and a depth map associated with the first image;
combining at least a portion of the sky lighting representation and at least a portion of the volumetric lighting representation to generate a hybrid lighting representation;
rendering a virtual object based, at least in part, on the hybrid lighting representation;
determining one or more second-order lighting effects for the virtual object, based at least on the hybrid lighting representation and a position of the virtual object in the first image; and
generating a second image depicting the virtual object and the second-order lighting effects positioned in the first image.

12. The method of claim 11, wherein the one or more second-order lighting effects are associated with an interaction between the virtual object and one or more objects depicted in the first image.

13. The method of claim 11, further comprising generating the depth map using one or more depth estimation models.

14. The method of claim 11, further comprising:
evaluating, using a discriminator, the second image against ground truth data; and
adjusting one or more parameters of a scene generation model based, at least in part, on an output of the discriminator.

15. The method of claim 11, wherein the first image is a single monocular image depicting an outdoor scene.

16. A processor, comprising:
one or more processing units to:
determine, based at least on image data representing a first image, a light field estimation for a scene depicted by the first image, the light field estimation including a sky model for the scene estimated by a first neural network and a volumetric spherical representation of the scene estimated by a second neural network and based at least on the sky model;
determine a position of a virtual object within the scene;
render the virtual object to include one or more first effects determined based at least on the position and the light field estimation;
determine one or more second effects within the scene based at least on the position of the virtual object within the scene; and
render a second image to include the virtual object at the position and a depiction of the one or more second effects within the scene.

17. The processor of claim 16, wherein the one or more processing units are further to:
generate a first lighting representation corresponding to a first light source;
generate a second lighting representation corresponding to a second light source; and
combine at least a portion of the first lighting representation and at least a portion of the second lighting representation to generate the light field estimation.

18. The processor of claim 17, wherein the first lighting representation corresponds to one or more lighting effects associated with sunlight and the second lighting representation corresponds to one or more lighting effects associated with spatially-varying effects within the scene.

19. The processor of claim 16, wherein the processor is comprised in at least one of:
a human-machine interface system of an autonomous or semi-autonomous machine;
a system for performing conversational AI operations;
a system for performing simulation operations;
a system for performing synthetic data generation or synthetic data augmentation;
a system for performing digital twin operations;
a system for performing deep learning operations;
a system implemented using an edge device;
a system implemented using a robot;
a system for performing collaborative content creation operations for 3D assets;
a system for generating graphical output for virtual reality systems, augmented reality systems, or mixed reality systems;
a system incorporating one or more virtual machines (VMs);
a system implemented at least partially in a data center; or
a system implemented at least partially using cloud computing resources.

* * * * *